Figure 1:
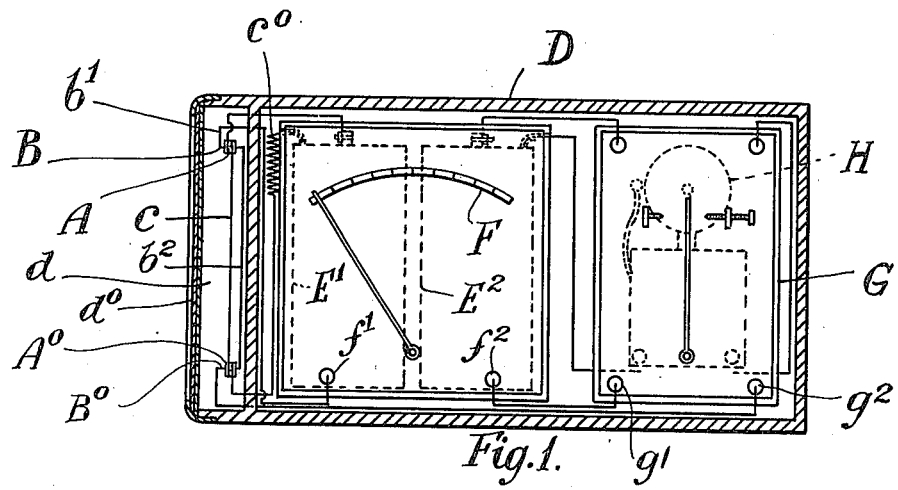

A. & L. D. WILLIAMS.
CONTRIVANCE FOR AUTOMATICALLY DETECTING THE PRESENCE OF CERTAIN GASES AND VAPORS.
APPLICATION FILED MAR. 16, 1915.

1,143,473.

Patented June 15, 1915.

UNITED STATES PATENT OFFICE.

ALFRED WILLIAMS AND LEO DAFT WILLIAMS, OF LONDON, ENGLAND.

CONTRIVANCE FOR AUTOMATICALLY DETECTING THE PRESENCE OF CERTAIN GASES AND VAPORS.

1,143,473. Specification of Letters Patent. Patented June 15, 1915.

Application filed March 16, 1915. Serial No. 14,754.

*To all whom it may concern:*

Be it known that we, ALFRED WILLIAMS and LEO DAFT WILLIAMS, citizens of the United States of America, and residents of 20 Bucklersbury, city of London, England, have invented a certain new and useful Improvement in Contrivances for Automatically Detecting the Presence of Certain Gases and Vapors, of which the following is a specification.

This invention relates to improved apparatus for detecting the presence of combustible gases or vapors in the atmosphere of a mine or other places.

The object of the present invention is to obtain an automatic indication of the degree of intermixture of the combustible gases with the atmosphere, particularly when that degree of intermixture is small such for example as one per cent. or less.

For the purpose of this invention we make use of the well known heating effect due to the interaction of catalytic substances such as finely divided platinum and palladium with combustible gases and vapors, to derive, through the medium of thermo-electric junctions an electrical manifestation of the heat development but, inasmuch as the purpose of this invention is to obtain a certain and quantitative indication of the presence of small proportions of such gases in the atmosphere, it is essential that the catalytic substance be maintained at a temperature in excess of that of the atmosphere or otherwise by the deposit of vapor from the atmosphere or by the accumulation of vapor which is very slowly produced by the interaction of the catalytic substance with hydrocarbon gases, the catalytic substance will be rendered inert to weak admixtures of combustible gases with the atmosphere.

To maintain the catalytic substance in an efficiently heated condition, its temperature should be in excess of that which would be derived by the interaction therewith of the diluted combustible gases, consequently it is necessary that what in a thermo-electric circuit are called the "hot" and the "cold" junctions, should be equally heated with great exactness by the extraneous source of heat requisite to maintain the catalytic substance at an efficient temperature. On this heating effect due to the extraneous source of heat is superposed at the "hot junction" the heat derived by the interaction with the catalytic substance of the combustible gases and vapors, such heating effect being carefully insulated from the "cold junction." By such an arrangement the thermo-electric current which will be generated will be entirely due to the catalytically generated heat. Under the circumstances the only efficient method of applying extraneous heat to the two opposite thermo-junctions appears to be that in which they are caused to be electrically heated by an extraneous current of electricity through a circuit adapted to equally heat both thermo-junctions.

As the electric-heating current will be much in excess of the thermo-electric current it will be very important to insulate the circuit which conveys the latter from that in which indicating current of very small voltage is conveyed.

In order to solve the practical problem of obtaining a warning of the presence of dangerous gases and a reliable indication of the degree of approach to danger well in advance of a catastrophe it is in the first place requisite that the indicating agent be maintained in an ultra-sensitive condition and that it be thoroughly protected from the effects of extraneous actions.

The accompanying drawing shows, as a representative example, a form of construction adapted to embody the above described invention and conveniently serve the purpose thereof.

Figure 2:
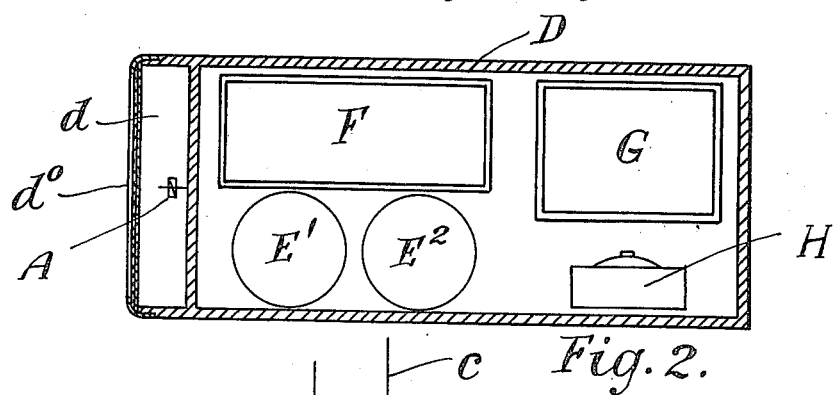

In this drawing:—Figure 1 is a plan view of a portable contrivance. Fig. 2 is a side elevation thereof, and Fig. 3 shows, on an enlarged scale, the construction of the essential component of the contrivance.

Figure 3:
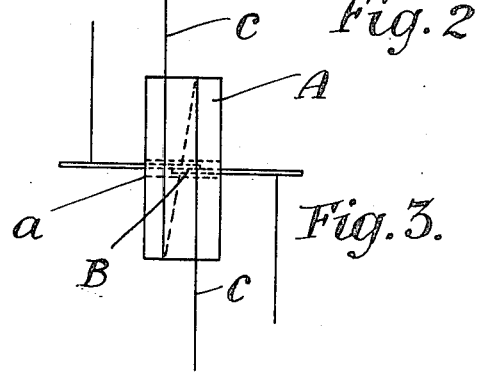

Referring first to Fig. 3: A represents a button comprising finely divided platinum or palladium or a combination thereof which is incorporated with a porous substance in a manner to provide a considerable area of contact of the contained metals to the surrounding atmosphere. Into an aperture *a* formed therein is inserted a thermo-electric element B consisting of a metallic joint of two suitably dissimilar metals, such for example as iron and a composition called eureka alloy which are known to promote the generation of an electric current when the joint is heated.

For the purpose of electrically heating the button a fine wire $c$ composed of platinum for example is wound around or embedded within the substance of the button A.

The essential component A above described together with an imitation, inert, button $A°$ from which the active heat-generating metal is omitted are located in a compartment $d$ provided in the front of a casing D and shielded by a pervious cover $d°$ composed of fine wire gauze with or without a disk of readily renewable filtering medium.

Within the casing D are located electric batteries $E^1$, $E^2$ and a millivoltmeter F and beyond these an electric relay G and an alarm bell H. The thermo-electric circuit starting from the junction B of the active button A is continued through the lead $b^1$ to the terminal $f^1$ of the voltmeter F and from the terminal $f^2$ thereof to the terminal $g^1$ of the relay G and from the terminal $g^2$ thereof to the thermo-electric junction $B°$ contained within the button $A°$ and thence to the active button A by the lead $b^2$.

When the voltage of the thermo-generated current exceeds a prescribed limit a circuit is completed by the relay G which requisitions the battery $E^2$ to effect the ringing of the bell H.

The battery $E^1$ serves to energize a circuit through the before-mentioned electric-heating wire $c$ in which circuit a resistance $c°$ is provided. By such means the buttons A and $A°$ are kept equally warm and dry when the apparatus is exposed to a pure atmosphere. When subjected to an impure atmosphere the voltage attained by the thermo-electric current which will then be generated can be observed through a window provided in the cover of the casing D, the graduation adopted being preferably such as to correspond with increasing percentage units of deleterious gases to be detected.

By electric-leads and a voltmeter above ground the condition of the atmosphere at any portion of a mine can at any moment be under observation.

We claim—

1. An apparatus for detecting, by electrical manifestations, the presence of combustible gases in the atmosphere, comprising a casing having an open and a sealed compartment, a pair of thermo-electric elements in the open compartment, a catalytic element in one of said thermo-electric elements, and a circuit for said thermo-electric elements, a voltmeter and a relay inserted in said circuit and situated in the sealed compartment, and means for maintaining said thermo-electric elements at an even heat.

2. An apparatus for detecting by electrical manifestations, the presence of combustible gases in the atmosphere, comprising a casing having an open and a sealed compartment, a pair of thermo-electric elements in the open compartment, a catalytic element in one of said thermo-electric elements, and a circuit for said thermo-electric elements, a voltmeter and a relay inserted in said circuit and situated in the sealed compartment, and means including a platinum wire connecting said thermo-electric elements, a circuit for the wire with a resistance coil, and a battery for maintaining said buttons at an even heat.

3. An apparatus for detecting by electrical manifestations, the presence of combustible gases in the atmosphere, comprising a casing having an open and a sealed compartment, a pair of thermo-electric elements in the open compartment, a catalytic element in one of said thermo-electric elements, and a circuit for said thermo-electric elements, a voltmeter and a relay inserted in said circuit and situated in the sealed compartment, and means including a platinum wire connecting said thermo-electric elements, a circuit for the wire with a resistance coil, and a battery for maintaining said thermo-electric elements at an even heat; a third circuit including an electric bell and a battery, said third circuit being closed by said relay when in operation.

ALFRED WILLIAMS.
LEO DAFT WILLIAMS.

Witnesses:
CLAUDE KIRKBY,
E. COLMAN RASHLEIGH.